(12) United States Patent
Yokoyama et al.

(10) Patent No.: US 11,675,999 B2
(45) Date of Patent: Jun. 13, 2023

(54) MACHINE LEARNING DEVICE

(71) Applicant: Toyota Jidosha Kabushiki Kaisha, Toyota Aichi-ken (JP)

(72) Inventors: Daiki Yokoyama, Gotemba (JP); Tomohiro Kaneko, Mishima (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 17/405,342

(22) Filed: Aug. 18, 2021

(65) Prior Publication Data

US 2022/0058463 A1 Feb. 24, 2022

(30) Foreign Application Priority Data

Aug. 20, 2020 (JP) .............................. JP2020-139433

(51) Int. Cl.
| | | |
|---|---|---|
| *G06N 3/04* | (2006.01) | |
| *G07C 5/08* | (2006.01) | |
| *G06F 18/214* | (2023.01) | |
| *G06K 9/62* | (2022.01) | |

(52) U.S. Cl.
CPC .............. *G06N 3/04* (2013.01); *G06F 18/214* (2023.01); *G07C 5/0808* (2013.01)

(58) Field of Classification Search
CPC .......... G06K 9/6256; G06K 9/62; G06N 3/04; G07C 5/0808; G07C 5/08; B60R 16/02; B60R 16/023; G05B 23/02; G06F 8/65
See application file for complete search history.

(56) References Cited

U.S. PATENT DOCUMENTS

| | | | | |
|---|---|---|---|---|
| 6,546,321 | B1 * | 4/2003 | Oh ...................... | F02D 41/2493 |
| | | | | 714/10 |
| 8,209,076 | B2 * | 6/2012 | Boss ...................... | G06Q 10/20 |
| | | | | 340/568.1 |
| 2008/0065290 | A1 * | 3/2008 | Breed ..................... | G01L 17/00 |
| | | | | 701/31.4 |
| 2010/0023203 | A1 * | 1/2010 | Shibi .................... | G07C 5/0808 |
| | | | | 701/31.4 |

(Continued)

FOREIGN PATENT DOCUMENTS

| | | |
|---|---|---|
| CN | 110996286 A | 4/2020 |
| JP | H1182137 A | 3/1999 |

(Continued)

OTHER PUBLICATIONS

Carvalho, Thyago P., et al. "A systematic literature review of machine learning methods applied to predictive maintenance." Computers & Industrial Engineering 137 (2019): 106024: 1-10 (Year: 2019).*

(Continued)

*Primary Examiner* — Kamran Afshar
*Assistant Examiner* — Randall K. Baldwin
(74) *Attorney, Agent, or Firm* — Dinsmore & Shohl LLP

(57) ABSTRACT

The machine learning device comprises a training part configured to train a machine learning model used in a vehicle; and a detecting part configured to detect replacement of a vehicle part mounted in the vehicle. The training part is configured to retrain the machine learning model using training data sets corresponding to a vehicle part after replacement when a vehicle part relating to input data of the machine learning model is replaced.

7 Claims, 7 Drawing Sheets

(56) References Cited

U.S. PATENT DOCUMENTS

| | | | |
|---|---|---|---|
| 2010/0087983 A1* | 4/2010 | Boss | G06Q 10/20 |
| | | | 701/31.4 |
| 2015/0015389 A1 | 1/2015 | McIntyre et al. | |
| 2018/0182187 A1* | 6/2018 | Tong | G07C 5/10 |
| 2018/0216557 A1 | 8/2018 | Klein et al. | |
| 2019/0197795 A1* | 6/2019 | Mondello | G07C 5/008 |
| 2019/0205765 A1* | 7/2019 | Mondello | G06N 3/088 |
| 2019/0215339 A1* | 7/2019 | Chen | H04L 63/1425 |
| 2019/0311262 A1* | 10/2019 | Nagasaka | F01N 9/00 |
| 2020/0125930 A1* | 4/2020 | Martin | G06V 20/56 |
| 2020/0143607 A1 | 5/2020 | Kitagawa et al. | |
| 2020/0241543 A1 | 7/2020 | Huger et al. | |
| 2020/0394407 A1* | 12/2020 | Shimazu | G06N 3/088 |
| 2021/0312567 A1* | 10/2021 | Hayward | G06V 20/00 |
| 2022/0109727 A1* | 4/2022 | Kishino | G06N 20/00 |
| 2022/0161815 A1* | 5/2022 | Van Beek | B60W 50/00 |

FOREIGN PATENT DOCUMENTS

| | | |
|---|---|---|
| JP | 2008-286251 A | 11/2008 |
| JP | 2019-183698 A | 10/2019 |
| JP | 2020-070774 A | 5/2020 |
| JP | 2020-119238 A | 8/2020 |
| JP | 2021-033629 A | 3/2021 |

OTHER PUBLICATIONS

Thonglek, Kundjanasith, et al. "IVAA: Intelligent Vehicle Accident Analysis System." 2019 16th International Joint Conference on Computer Science and Software Engineering (JCSSE). IEEE, 2019: 85-90 (Year: 2019).*

Non-Final Office Action dated Dec. 7, 2021 in U.S. Appl. No. 17/405,390, filed Aug. 18, 2021.

Final Office Action dated Mar. 15, 2022 in U.S. Appl. No. 17/405,390, filed Aug. 18, 2021.

Notice of Allowance dated Jun. 13, 2022 in U.S. Appl. No. 17/405,390, filed Aug. 18, 2021.

Corrected Notice of Allowance dated Sep. 19, 2022 to U.S. Appl. No. 17/405,390, filed Aug. 18, 2021.

Notice of Allowance dated Aug. 3, 2022 to U.S. Appl. No. 17/405,390, filed Aug. 18, 2021.

* cited by examiner

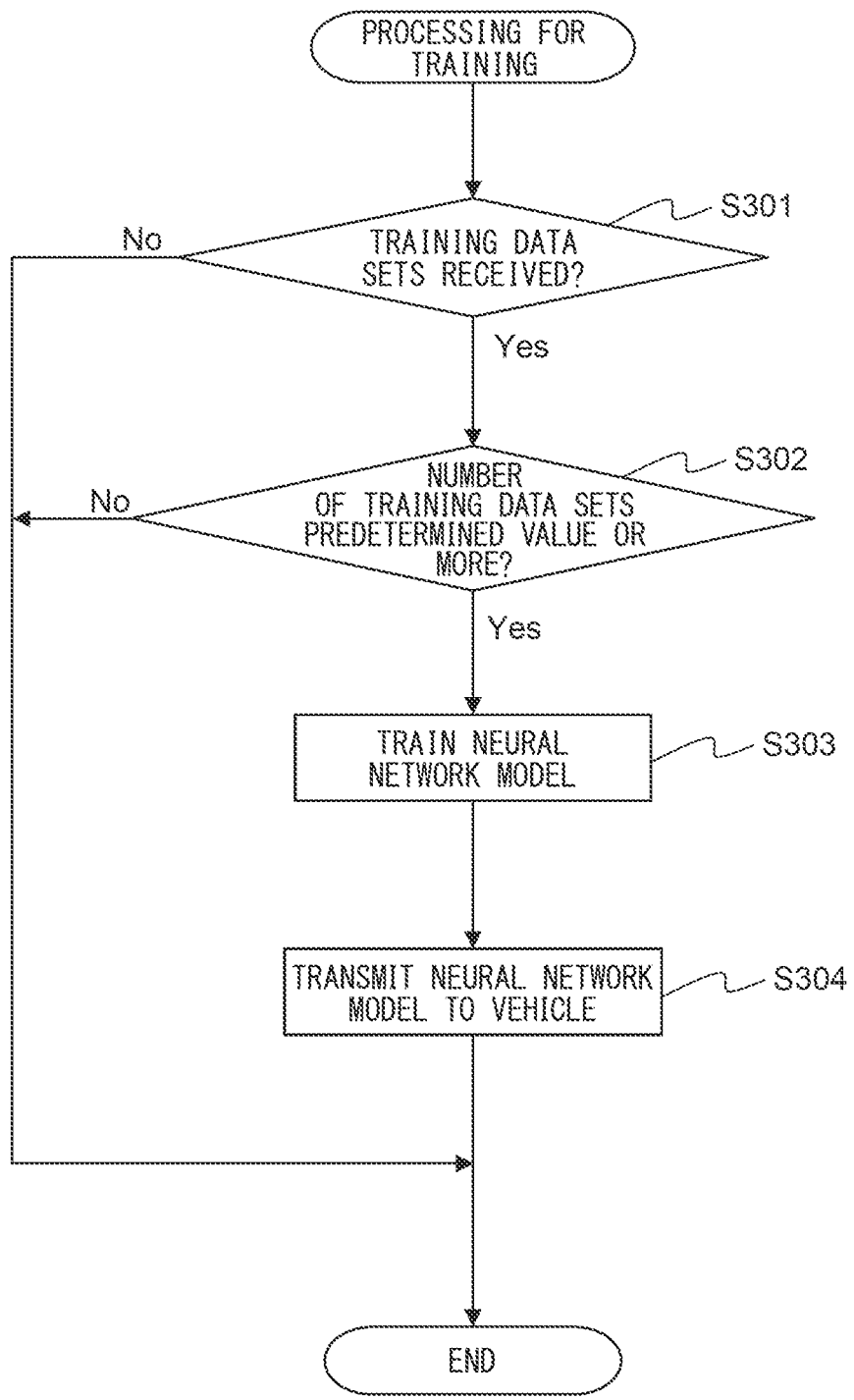

MACHINE LEARNING DEVICE

CROSS-REFERENCE TO RELATED APPLICATION

This application claims priority to Japanese Patent Application No. 2020-139433 filed on Aug. 20, 2020, the entire contents of which are herein incorporated by reference.

FIELD

The present disclosure relates to a machine learning device.

BACKGROUND

In recent years, along with the development of AI (artificial intelligence) technology, in vehicles, control using a machine learning model such as a neural network model has been studied. For example, in the machine learning device described in Japanese Unexamined Patent Publication No. 2019-183698, a neural network is used to predict the temperature of an exhaust purification catalyst provided in an internal combustion engine.

In order to improve the precision of prediction of such a neural network model, it is necessary to train the neural network in advance. For example, as described in Japanese Unexamined Patent Publication No. 2019-183698, the neural network model is trained in a server, and the trained neural network model is sent from the server to a vehicle.

SUMMARY

Technical Problem

In this regard, if, along with use of a vehicle, the vehicle parts become degraded or break down, the vehicle parts are replaced. Further, vehicle parts are sometimes replaced for mounting higher performance vehicle parts in a vehicle.

However, a machine learning model used in a vehicle is usually tailored to the properties of the vehicle part before replacement. Therefore, if replacement of a vehicle part causes the properties of the vehicle part to change, the precision of prediction of the machine learning model is liable to fall.

Therefore, in consideration of the above problem, an object of the present disclosure is to keep the precision of prediction of a machine learning model used in a vehicle from falling if a vehicle part is replaced.

Solution to Problem

The summary of the present disclosure is as follows.

(1) A machine learning device comprising: a training part configured to train a machine learning model used in a vehicle; and a detecting part configured to detect replacement of a vehicle part mounted in the vehicle, wherein the training part is configured to retrain the machine learning model using training data sets corresponding to a vehicle part after replacement when a vehicle part relating to input data of the machine learning model is replaced.

(2) The machine learning device described in above (1), wherein the training part is configured to retrain the machine learning model using training data sets corresponding to a vehicle part after replacement only when a vehicle part relating to input data of the machine learning model is replaced with a vehicle part of a different configuration.

(3) The machine learning device described in above (1) or (2), further comprising an updating part configured to update the machine learning model, wherein the training part is provided at a server and is configured to transmit a retrained machine learning model to the vehicle, and the updating part is configured to apply the retrained machine learning model to the vehicle.

(4) The machine learning device described in above (1) or (2), wherein the training part is provided at the vehicle and is configured to apply a retrained machine learning model to the vehicle.

(5) The machine learning device described in above any one of (1) to (4), wherein the machine learning model is a neural network model, and the training part is configured to retrain the machine learning model by updating parameters of the machine learning model set before retraining.

Advantageous Effects

According to the present disclosure, it is possible to keep the precision of prediction of a machine learning model used in a vehicle from falling if a vehicle part is replaced.

BRIEF DESCRIPTION OF DRAWINGS

FIG. 9 is a flow chart showing a control routine of processing for retraining in the second embodiment of the present disclosure.

DETAILED DESCRIPTION

Figure 1:
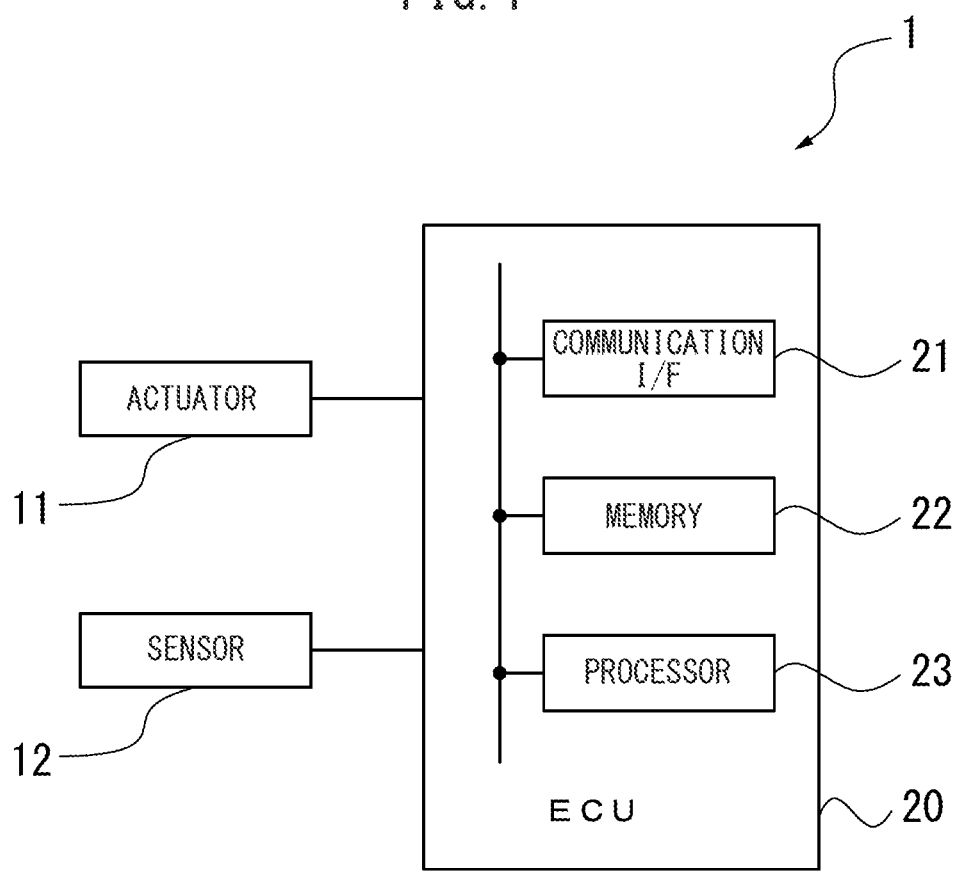
FIG. 1 is a view schematically showing the configuration of a vehicle at which a machine learning device according to a first embodiment of the present disclosure is provided.

Below, referring to the drawings, embodiments of the present disclosure will be explained in detail. Note that, in the following explanation, similar component elements will be assigned the same reference notations.

First Embodiment

First, referring to FIG. 1 to FIG. 4, a first embodiment of the present disclosure will be explained. FIG. 1 is a view schematically showing the configuration of a vehicle 1 at which a machine learning device according to the first embodiment of the present disclosure is provided.

As shown in FIG. 1, the vehicle 1 is provided with actuators 11, sensors 12, and an electronic control unit (ECU) 20. That is, the actuators 11, the sensors 12, and the ECU 20 are mounted in the vehicle 1. The actuators 11 and the sensors 12 are connected to be able to communicate with the ECU 20 through an internal vehicle network based on the CAN (Controller Area Network) or other standard.

The actuators 11 are operating parts required for the vehicle 1 to run. For example, they include parts required for operation of the internal combustion engine (spark plugs, fuel injectors, a throttle valve-drive actuator, an EGR control valve, etc.), a motor, a clutch, etc. The ECU 20 controls the actuators 11.

The sensors 12 detect the states of the vehicle 1, the internal combustion engine, the battery, etc., and include a vehicle speed sensor, a GPS receiver, an accelerator opening degree sensor, an air flowmeter, an air-fuel ratio sensor, a crank angle sensor, a torque sensor, a voltage sensor, a temperature sensor, etc. The outputs of the sensors 12 are sent to the ECU 20.

The actuators 11 and the sensors 12 constitute vehicle parts mounted in the vehicle 1. In other words, the vehicle parts include the actuators 11 and the sensors 12.

The ECU 20 includes a communication interface 21, a memory 22, and a processor 23 and performs various control operations of the vehicle 1. Note that, in the present embodiment, a single ECU 20 is provided, but a plurality of ECUs may be provided for the different functions.

The communication interface 21 is an interface circuit for connecting the ECU 20 to an internal vehicle network based on the CAN or other standard. The ECU 20 communicates with other vehicle-mounted devices through the communication interface 21.

The memory 22, for example, has a volatile semiconductor memory (for example, a RAM) and nonvolatile semiconductor memory (for example, a ROM). The memory 22 stores programs run in the processor 23, various data used when the various processings are performed by the processor 23, etc.

The processor 23 has one or more CPUs (central processing units) and their peripheral circuits and performs various processing. Note that, the processor 23 may further have processing circuits such as arithmetic logic units or numerical calculation units. The communication interface 21, the memory 22 and the processor 23 are connected to each other through signal wires.

Figure 2:
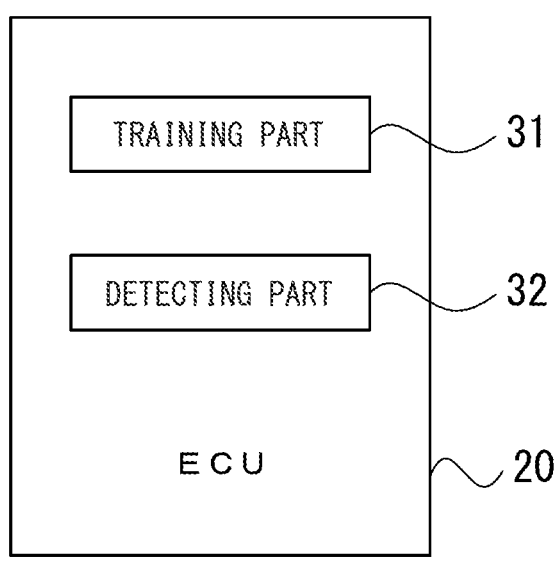
FIG. 2 is a functional block diagram of an ECU of FIG. 1.

In the present embodiment, the ECU 20 functions as a machine learning device. FIG. 2 is a functional block diagram of the ECU 20 of FIG. 1. The ECU 20 has a training part 31 and a detecting part 32. The training part 31 and the detecting part 32 are functional blocks realized by a program stored in the memory 22 of the ECU 20 run by the processor 23 of the ECU 20.

The training part 31 trains the machine learning model used in the vehicle 1. In the present embodiment, as the machine learning model, a neural network model outputting at least one output data (which is also called "a target variable") from a plurality of input data (which are also called "explanatory variables") is used.

Figure 3:
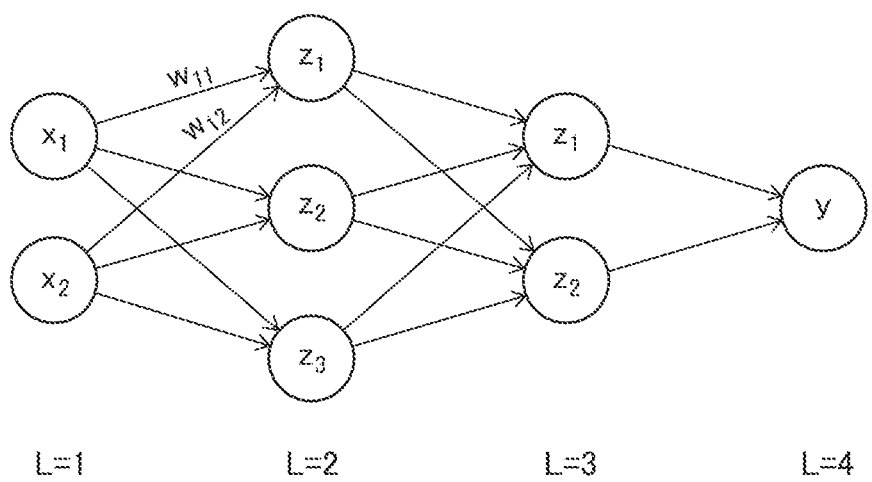
FIG. 3 shows one example of a neural network model having a simple configuration.

First, referring to FIG. 3, a neural network model will be explained in outline. FIG. 3 shows one example of a neural network model having a simple configuration.

The circle marks in FIG. 3 show artificial neurons. An artificial neuron is usually called a "node" or "unit" (in this Description, called a "node"). In FIG. 3, L=1 indicates an input layer, L=2 and L=3 indicates hidden layers, and L=4 indicates an output layer. Note that, the hidden layers are also called "intermediate layers".

In FIG. 3, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 3, the total input values $u_k^{(L=2)}$ calculated at the nodes shown by $z_k^{(L=2)}$ (k=1, 2, 3) of the hidden layer (L=2) become as in the following equation (M is the number of nodes of the input layer).

$$u_k^{(L=2)} = \sum_{m=1}^{M} (x_m \cdot w_{km}^{(L=2)}) + b_k \qquad \text{[Equation 1]}$$

Next, this total input values $u_k^{(L=2)}$ are converted by the activation function "f" and are output as the output values $z_k^{(L=2)}(=f(u_k^{(L=2)}))$ from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "b" are used to calculate the total input values "u"(=Σz·w+b). The total input values "u" are similarly converted by an activation function and are output from the nodes of the hidden layers (L=3) as the output values $z_1^{(L=3)}$ and $z_2^{(L=3)}$. The activation function is for example a Sigmoid function σ.

Further, the node of the output layer (L=4) receives as input the output values $z_1^{(L=3)}$ and $z_2^{(L=3)}$ of the nodes of the hidden layer (L=3). At the node of the output layer, the corresponding weights "w" and biases "b" are used to calculate the total input value "u" (Σz·w+b) or only the corresponding weights "w" are used to calculate the total input value "u" (Σz·w). For example, at the node of the output layer, an identity function is used as the activation function. In this case, the total input value "u" calculated at the node of the output layer is output as it is as the output value "y" from the node of the output layer.

The neural network model used in the vehicle 1 is stored in the memory 22 of the ECU 20 or another storage device provided at the vehicle 1. The ECU 20 inputs values of a plurality of input data (input values) to the neural network model to thereby make the neural network model output the value of at least one output data (output value). At this time, as the values of the input data, for example, output values of the sensors 12, command values from the ECU 20 to the actuators 11, values calculated at the ECU 20, etc., are used.

The value of the output data output from the neural network model is used for control of the vehicle 1. Note that, the neural network model may be either of a regression model and a classification model. If the neural network model is a regression model, the output data, for example, is the output torque of the internal combustion engine, the concentration of predetermined constituent in the exhaust gas (HC, NOx, etc.), the state of charge (SOC) of the battery, etc. On the other hand, if the neural network model is a classification model, the output data is, for example, a result of judgment of abnormality of a predetermined sensor 12, a result of judgment of startup of the internal combustion engine in a hybrid vehicle, etc. As input data, a state quantity correlated with the output data is suitably selected.

In order to improve the precision of this neural network model, it is necessary to train the neural network model in advance. For this reason, for example, the neural network model is trained in the vehicle production plant, etc.

In training the neural network model, training data sets comprised of combinations of measured values of a plurality of input data and measured values of at least one output data corresponding to these measured values of the plurality of input data (truth data or teacher data) are used. The measured values of the input data and output data are for example acquired using an engine bench, etc., and the training data sets are created by combining the corresponding measured values.

In training the neural network model, a large number of training data sets are used and the known back propagation method is used to repeatedly update the parameters of the neural network model (weights "w" and biases "b") so that the difference between the values of the output data output by the neural network model and the measured values of the output data becomes smaller. As a result, the neural network model is trained and a trained neural network model is created. The created trained neural network model is loaded in the ECU 20 of the vehicle 1 before shipment of the vehicle 1. That is, information of the trained neural network model (structure, weights "w", biases "b", etc., of the model) is stored in the memory 22 of the ECU 20 or another storage device provided in the vehicle 1. Note that, a neural network model may be trained by the training part 31 after the vehicle 3 is shipped, and the trained neural network model may be created by the training part 31.

In this regard, if a vehicle part such as the actuator 11 or the sensor 12 deteriorates or breaks down along with use of the vehicle 1, the vehicle part is replaced. Further, sometimes a vehicle part is replaced in order to mount a higher performance vehicle part in the vehicle 1.

However, the neural network model loaded in the ECU 20 is tailored to the properties of the vehicle part before replacement. For this reason, if the properties of a vehicle part change due to replacement of the vehicle part, the precision of prediction of the neural network model is liable to fall. For example, if a vehicle part is replaced with a vehicle part with a different configuration, usually the properties of the vehicle part change. Further, even if a vehicle part is replaced with a vehicle part with the same configuration, individual variations will sometimes cause the properties of the vehicle part to change.

Therefore, in the present embodiment, the detecting part 32 detects replacement of a vehicle part mounted in the vehicle 1. Further, if a vehicle part relating to input data of a neural network model is replaced, the training part 31 uses the vehicle part after replacement to create training data sets corresponding to the vehicle part after replacement and uses these training data sets to retrain the neural network model. By retraining the neural network model in accordance with replacement of a vehicle part in this way, if a vehicle part is replaced, it is possible to keep the precision of prediction of the neural network model used in the vehicle 1 from falling.

Figure 4:
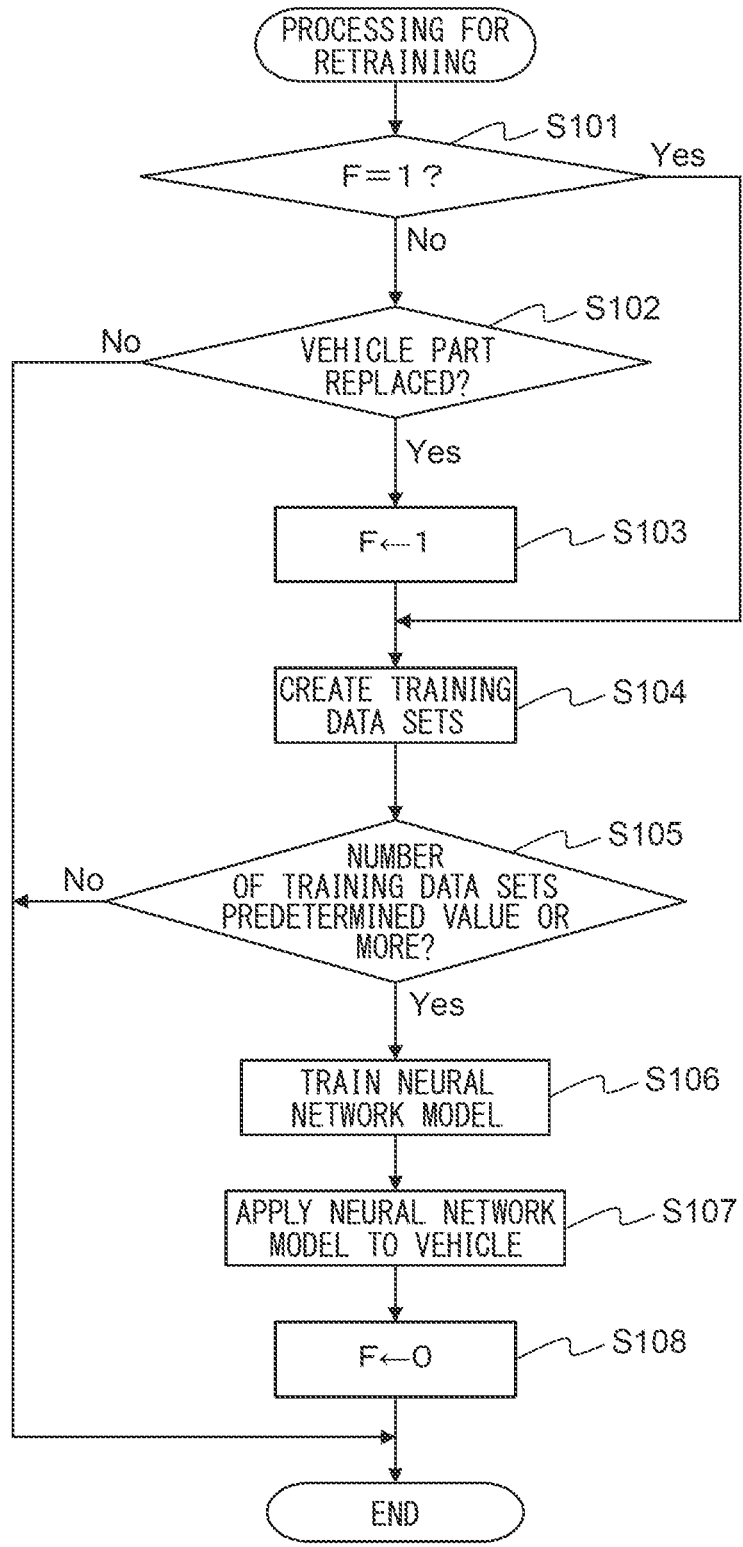
FIG. 4 is a flow chart showing a control routine of processing for retraining in the first embodiment of the present disclosure.

Below, using the flow chart of FIG. 4, the above-mentioned control will be explained in detail. FIG. 4 is a flow chart showing the control routine of processing for retraining in the first embodiment of the present disclosure. The present control routine is repeatedly performed by the ECU 20 at predetermined run intervals.

First, at step S101, the detecting part 32 judges whether a replacement flag F is "1". The replacement flag F is a flag which is set to "1" when a vehicle part is replaced. The initial value of the replacement flag F is zero. If at step S101 it is judged that the replacement flag F is zero, the present control routine proceeds to step S102.

At step S102, the detecting part 32 judges whether a vehicle part relating to input data of the neural network model has been replaced. For example, if an output value of a sensor 12 is used as input data of the neural network model, the sensor 12 corresponds to a vehicle part relating to input data of the neural network model. Further, if a command value from the ECU 20 to an actuator 11 is used as input data of the neural network model, the actuator 11 corresponds to a vehicle part relating to input data of the neural network model.

The detecting part 32, for example, reads the identification information of the vehicle part (model number, serial number, manufacturing number, etc.,) to detect replacement of a vehicle part. Further, the detecting part 32 may detect an output waveform, an operating voltage, etc., of a vehicle part to detect replacement of a vehicle part. Further, a worker may input replacement of a vehicle part to an input device (HMI etc.,) of the vehicle 1 and a detecting part 32 may detect replacement of a vehicle part based on input to the input device.

If at step S102 it is judged that a vehicle part has not been replaced, the present control routine ends. On the other hand, if at step S102 it is judged that a vehicle part has been replaced, the present control routine proceeds to step S103. At step S103, the detecting part 32 sets the replacement flag F to "1".

Next, at step S104, the training part 31 creates training data sets corresponding to the vehicle part after replacement. In the training data sets corresponding to the vehicle part after replacement, the output value of the vehicle part after replacement, the command value to the vehicle part after replacement, etc., are used as one of the measured values of input data. Further, the vehicle 1 is provided with sensors 12, etc., for acquiring measured values of output data of the neural network model. For this reason, the training part 31 can combine measured values corresponding to the input data and output data to create the training data sets.

Next, at step S105, the training part 31 judges whether the number of training data sets corresponding to a vehicle part after replacement is equal to or greater than a predetermined value. The predetermined value is set in advance and is set to a number required for obtaining the required precision of prediction of the neural network model. If at step S105 it is judged that the number of training data sets is less than the predetermined value, the present control routine ends. On the other hand, if at step S105 it is judged that the number of the training data sets is equal to or greater than the predetermined value, the present control routine proceeds to step S106.

At step S106, the training part 31 uses training data sets corresponding to the vehicle part after replacement to train (retrain) the neural network model. Specifically, the training part 31 repeatedly updates the parameters of the neural network model (weights "w" and biases "b") by the known back propagation method and creates a retrained neural network model so that the difference between the values of the output data output by the neural network model and the measured values of the output data becomes smaller.

For example, the initial values of the parameters (weights "w" and biases "b") when starting retraining are set to the predetermined values. Further, the initial values of the parameters when starting retraining may be values set before retraining, that is, the values learned for the vehicle part before replacement. In other words, the training part 31 may retrain the neural network model by updating the parameters of the neural network model set before retraining. By doing this, it is possible to efficiently raise the precision of prediction of the neural network model by retraining and in turn possible to decrease the number of training data sets required.

Next, at step S107, the training part 31 applies the retrained neural network model to the vehicle 1. In other words, the training part 31 updates the neural network model used in the vehicle 1. That is, the information of the neural network model stored in the memory 22 of the ECU 20 or another storage device is rewritten. By using a retrained neural network model in the vehicle 1, it is possible to predict the value of output data corresponding to input data of predetermined values without detecting the actual value of output data by the sensors 12, etc.

Next, at step S108, the training part 31 sets the replacement flag F to zero. After step S108, the present control routine ends.

Note that the properties of a vehicle part greatly change when a vehicle part is replaced by a vehicle part of a different configuration. For this reason, the training part 31 may retrain the neural network model using training data sets corresponding to the vehicle part after replacement only when a vehicle part relating to input data of the neural network model is replaced with a vehicle part of a different configuration. By doing this, it is possible to effectively keep the precision of prediction of the neural network model from falling while decreasing the amount of power consumed for retraining. In this case, at step S102, the detecting part 32 judges whether a vehicle part relating to input data of the neural network model has been replaced by a vehicle part of a different configuration.

Second Embodiment

The configuration and control of the machine learning device according to the second embodiment are basically the same as the configuration and control of the machine learning device according to the first embodiment except for the points explained below. For this reason, below, the second embodiment of the present disclosure will be explained centered on the parts different from the first embodiment.

Figure 5:
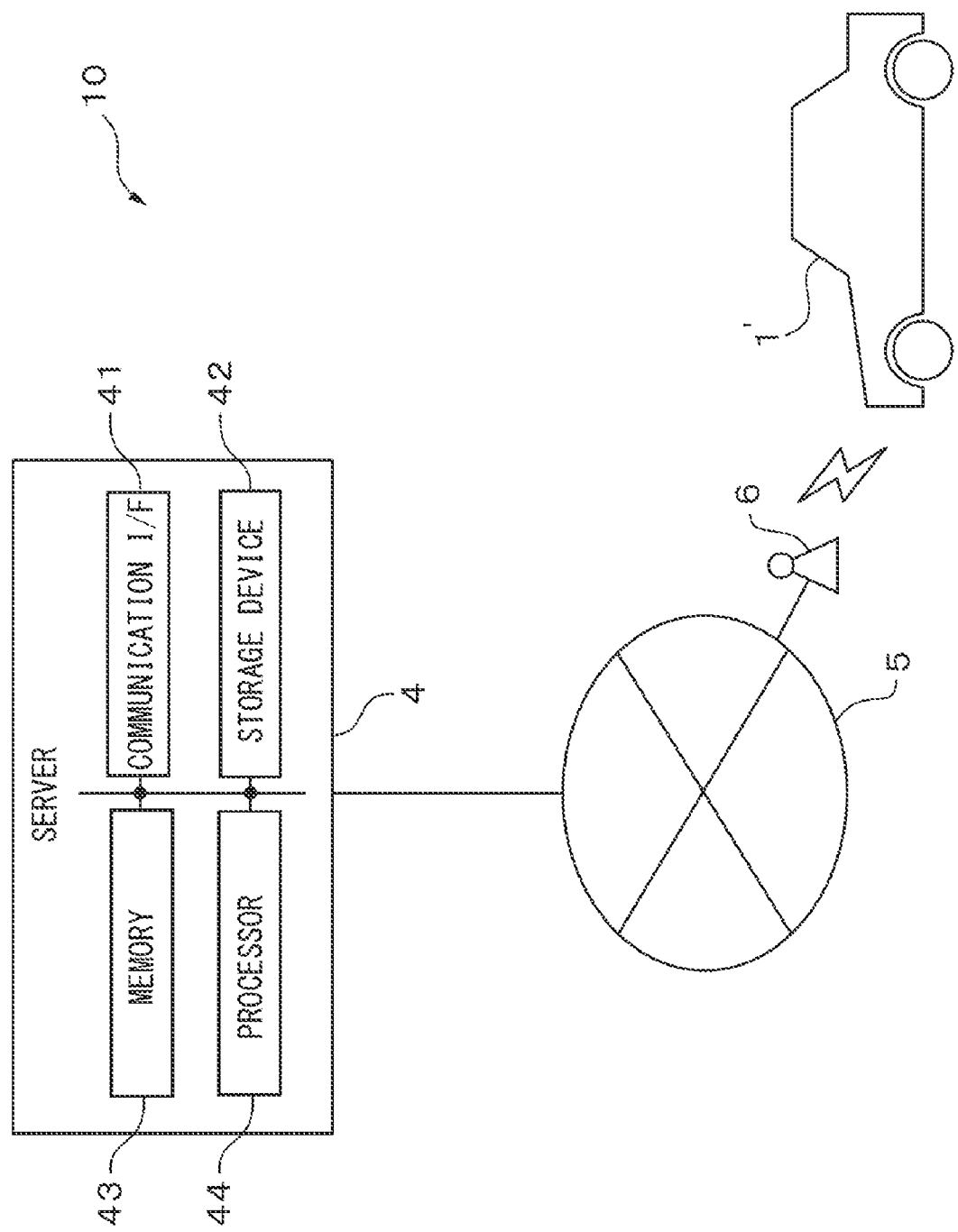
FIG. 5 is a schematic view of the configuration of a client-server system to which a machine learning device according to a second embodiment of the present disclosure is applied.

FIG. 5 is a schematic view of the configuration of a client-server system 10 to which a machine learning device according to the second embodiment of the present disclosure is applied. The client-server system 10 is provided with a vehicle 1' and a server 4. The server 4 can communicate with a plurality of vehicles including the vehicle 1'.

As shown in FIG. 5, the server 4 is provided outside of the vehicle 1' and is provided with a communication interface 41, a storage device 42, a memory 43, and a processor 44. Note that, the server 4 may be further provided with an input device such as a keyboard and mouse and an output device such as a display etc. Further, the server 4 may be configured by a plurality of computers.

The communication interface 41 can communicate with the vehicle 1' and enables the server 4 to communicate with the vehicle 1'. Specifically, the communication interface 41 has an interface circuit for connecting the server 4 to the communication network 5. The server 4 communicates with the vehicle 1' through the communication interface 41, communication network 5, and wireless base station 6. The communication interface 41 is one example of a communication device.

The storage device 42, for example, has a hard disk drive (HDD), solid state drive (SSD), optical storage medium, etc. The storage device 42 stores various types of data, for example, stores computer programs for the processor 44 to perform various processing, etc.

The memory 43, for example, has a semiconductor memory such as a random access memory (RAM). The memory 43, for example, stores various data etc., used when various processing is performed by the processor 44.

The communication interface 41, the storage device 42, and the memory 43 are connected through signal wires to the processor 44. The processor 44 has one or more CPUs and peripheral circuits and performs various processing. Note that, the processor 44 may further have processing circuits such as arithmetic logic units or numerical calculation units. The processor 44 is an example of a control device.

Figure 6:
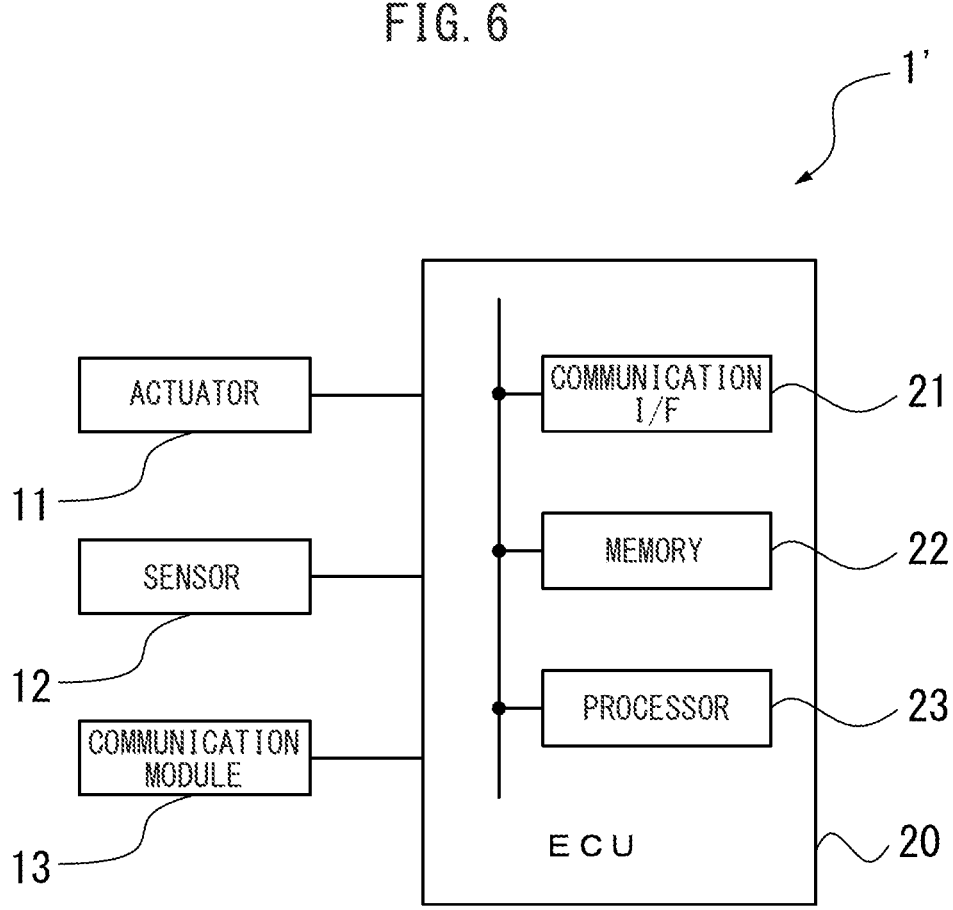
FIG. 6 is a view schematically showing a part of the configuration of the vehicle of FIG. 5.

FIG. 6 is a view schematically showing a part of the configuration of the vehicle 1' of FIG. 5. As shown in FIG. 6, the vehicle 1' is provided with actuators 11, sensors 12, and an ECU 20 plus a communication module 13. The actuators 11, the sensors 12, and the communication module 13 are connected to be able to communicate with the ECU 20 through an internal vehicle network based on the CAN (Controller Area Network) or other standard.

The communication module 13 is a device enabling communication between the vehicle 1' and the outside of the vehicle 1'. The communication module 13, for example, is a data communication module (DCM) able to communicate with a communication network 5 through a wireless base station 6. Note that, as the communication module 13, a mobile terminal (for example, a smart phone, a tablet terminal, a WiFi router, etc.,) may be used. The communication module 13 is one example of a communication device.

Figure 7:
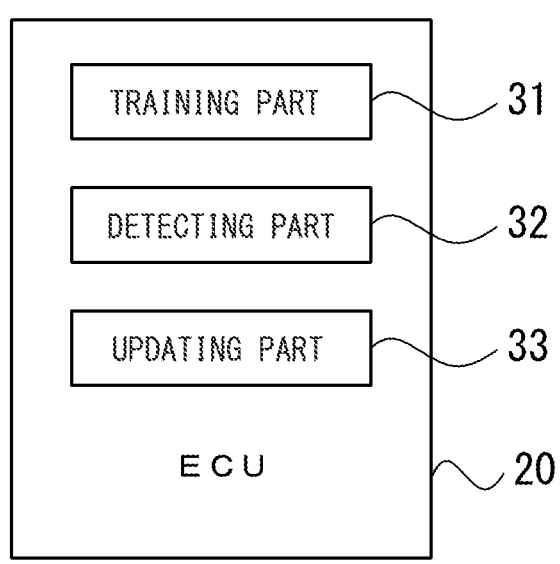
FIG. 7 is a functional block diagram of an ECU of FIG. 6.

In the second embodiment, the ECU 20 functions as a part of the machine learning device. FIG. 7 is a functional block diagram of the ECU 20 of FIG. 6. The ECU 20 has a detecting part 32 and an updating part 33. The detecting part 32 and the updating part 33 are functional blocks realized by a program stored in the memory 22 of the ECU 20 being run by the processor 23 of the ECU 20.

The detecting part 32, in the same way as the first embodiment, detects replacement of a vehicle part mounted in the vehicle 1. The updating part 33 updates the neural network model used in the vehicle 1'.

In the second embodiment, the neural network model used in the vehicle 1' is trained at the server 4 and the trained neural network model is transmitted from the server 4 to the vehicle 1'. That is, the processor 44 of the server 4 functions as a training part for training the neural network model used in the vehicle 1'.

If a vehicle part relating to input data of a neural network model is replaced, the processor 44 uses training data sets corresponding to the vehicle part after replacement to retrain the neural network model and transmits the retrained neural network model to the vehicle 1'. If receiving the retrained neural network model from the server 4, the updating part 33 of the vehicle 1' applies the retrained neural network model to the vehicle 1'. By retraining the neural network model in accordance with replacement of a vehicle part in this way, it is possible to keep the precision of prediction of the neural network model used in the vehicle 1' from falling if a vehicle part is replaced.

Figure 8:
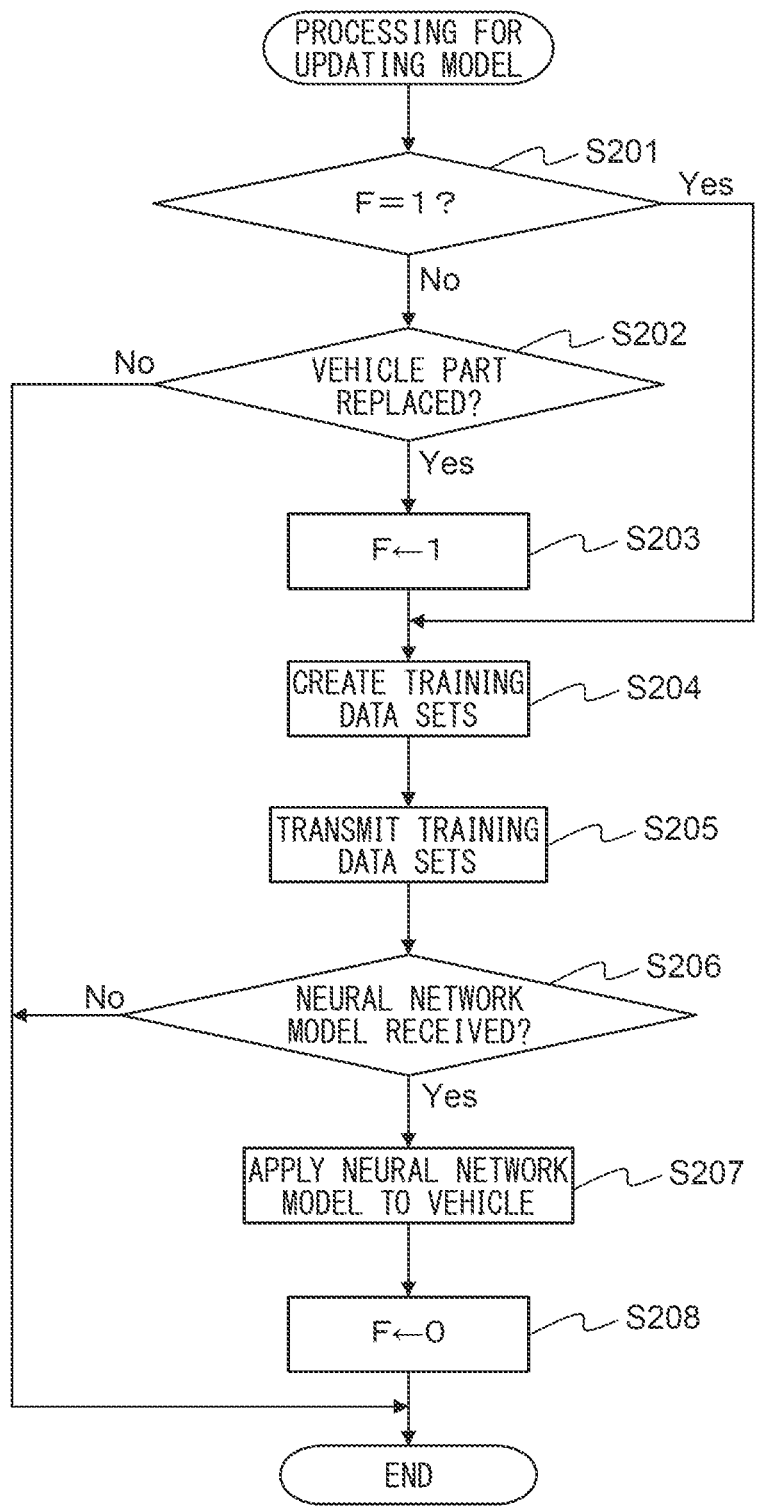
FIG. 8 is a flow chart showing a control routine of processing for updating a model in the second embodiment of the present disclosure.

Below, flow charts of FIG. 8 and FIG. 9 will be used to explain in detail the above control. FIG. 8 is a flow chart showing a control routine of processing for updating a model in the second embodiment of the present disclosure.

The present control routine is repeatedly performed at predetermined run intervals by the ECU 20 of the vehicle 1'.

First, at step S201, the detecting part 32 judges whether a replacement flag F is "1". The replacement flag F is a flag which is set to "1" when a vehicle part is replaced. The initial value of the replacement flag F is zero. If at step S201 it is judged that the replacement flag F is zero, the present control routine proceeds to step S202.

At step S202, in the same way as step S102 of FIG. 4, the detecting part 32 judges whether a vehicle part relating to input data of a neural network model has been replaced. If it is judged that a vehicle part has not been replaced, the present control routine ends. On the other hand, if it is judged that a vehicle part has been replaced, the present control routine proceeds to step S203.

At step S203, the detecting part 32 sets the replacement flag F to "1". After step S203, the present control routine proceeds to step S204. On the other hand, if at step S201 it is judged that the replacement flag F is "1", the present control routine skips steps S202 and S203 and proceeds to step S204.

At step S204, the updating part 33 creates training data sets corresponding to the vehicle part after replacement. In the training data sets corresponding to the vehicle part after replacement, the output value of the vehicle part after replacement, command value to the vehicle part after replacement, etc., are used as one of the measured values of the input data. Further, the vehicle 1' is provided with sensors 12, etc., for acquiring measured values of output data of the neural network model. For this reason, the updating part 33 can combine measured values corresponding to the input data and output data to create the training data sets.

Next, at step S205, the updating part 33 transmits the training data sets corresponding to the vehicle part after replacement to the server 4.

Next, at step S206, the updating part 33 judges whether the retrained neural network model has been received from the server 4. If it is judged that the retrained neural network model has not been received, the present control routine ends. On the other hand, if it is judged that the retrained neural network model has been received, the present control routine proceeds to step S207.

At step S207, the updating part 33 applies the retrained neural network model to the vehicle 1'. In other words, updating part 33 updates the neural network model used in the vehicle 1'. That is, the information of the neural network model stored in the memory 22 of the ECU 20 or another storage device is rewritten.

Next, at step S208, the updating part 33 resets the replacement flag F to zero. After step S109, the present control routine ends.

FIG. 9 is a flow chart showing the control routine of processing for retraining in the second embodiment of the present disclosure. The present control routine is repeatedly performed by the processor 44 of the server 4 at predetermined run intervals.

First, at step S301, the processor 44 judges whether it has received training data sets corresponding to the vehicle part after replacement from the vehicle 1'. If it is judged that it has not received the training data sets, the present control routine ends. On the other hand, if it is judged that it has received the training data sets, the present control routine proceeds to step S302.

Next, at step S302, the processor 44 judges whether the number of training data sets corresponding to a vehicle part after replacement is equal to or greater than a predetermined value. The predetermined value is set in advance and is set to a number required for obtaining the required precision of prediction of the neural network model. If at step S302 it is judged that the number of training data sets is less than a predetermined value, the present control routine ends. On the other hand, if at step S302 it is judged that the number of the training data sets is equal to or greater than a predetermined value, the present control routine proceeds to step S303.

At step S303, the processor 44 uses training data sets corresponding to the vehicle part after replacement to train (retrain) the neural network model. Specifically, the processor 44 repeatedly updates the parameters of the neural network model (weights "w" and biases "b") by the known back propagation method and creates a retrained neural network model so that the difference between the values of the output data output by the neural network model and the measured values of the output data becomes smaller.

For example, the initial values of the parameters (weights "w" and biases "b") when starting retraining are set to the predetermined values. Further, the initial values of the parameters when starting retraining may be values set before retraining, that is, the values learned for the vehicle part before replacement. In other words, the processor 44 may retrain the neural network model by updating the parameters of the neural network model set before retraining. By doing this, it is possible to efficiently raise the precision of prediction of the neural network model by retraining and in turn possible to decrease the number of training data sets required.

Next, at step S304, the processor 44 transmits the retrained neural network model to the vehicle 1'. After step S304, the present control routine ends.

Note that, training data sets corresponding to the vehicle part after replacement may be transmitted from a vehicle other than the vehicle 1' to the server 4. Further, the training data sets corresponding to the vehicle part after replacement may be created at the server 4 using an engine bench, etc.

Further, as explained above, the properties of a vehicle part greatly change when a vehicle part is replaced with a vehicle part of a different configuration. For this reason, the processor 44 may retrain the neural network model using training data sets corresponding to the vehicle part after replacement only when a vehicle part relating to input data of the neural network model is replaced with a vehicle part of a different configuration. By doing this, it is possible to effectively keep the precision of prediction of the neural network model from falling while decreasing the amount of power consumed for retraining. In this case, at step S202, the detecting part 32 judges whether a vehicle part relating to input data of the neural network model has been replaced with a vehicle part of a different configuration.

Above, embodiments according to the present disclosure were explained, but the present disclosure is not limited to these embodiments and can be corrected and changed in various ways within the language of the claims. For example, the machine learning model used in the vehicle 1, 1' may be a machine learning model other than a neural network such as a random forest, a k-nearest neighbor method, a support vector machine, etc.

REFERENCE SIGNS LIST 1, 1' vehicle
11 actuator
12 sensor
20 electronic control unit (ECU)

31 training part
32 detecting part
33 updating part
4 server
44 processor

The invention claimed is:

1. A machine learning device comprising a processor configured to:
   train a first machine learning model used in a vehicle using training data sets corresponding to a first vehicle part as input data, and
   detect replacement of the first vehicle part mounted in the vehicle, wherein
   the processor is configured to retrain the first machine learning model to obtain a second machine learning model using training data sets corresponding to a second vehicle part after replacement in response to detecting a replacement of the first vehicle part with the second vehicle part only when the detecting detects that the first vehicle part relating to input data of the first machine learning model is replaced with the second vehicle part having a different configuration or different properties than the first vehicle part,
   wherein the processor detects the replacement of the first vehicle part mounted in the vehicle based on an output value of the first vehicle part; and
   wherein the output value is an output waveform or an operating voltage of the first vehicle part.

2. The machine learning device according to claim 1, wherein the processor includes a first processor configured to detect replacement of the first vehicle part mounted in the vehicle, and a second processor configured to retrain the first machine learning model to obtain the second machine learning model,
   the second processor is provided at a server and is configured to transmit the second machine learning model to the vehicle, and
   the first processor is configured to apply the second machine learning model to the vehicle.

3. The machine learning device according to claim 1, wherein the processor is provided at the vehicle and is configured to apply the second machine learning model to the vehicle.

4. The machine learning device according to claim 1, wherein the first machine learning model is a neural network model, and
   the processor is configured to retrain the first machine learning model by updating parameters of the first machine learning model set before retraining.

5. A machine learning device comprising:
   a processor configured to:
   train a first machine learning model used in a vehicle using training data sets corresponding to a first vehicle part as input data, and
   detect replacement of the first vehicle part mounted in the vehicle,
   wherein the processor is configured to retrain the first machine learning model to obtain a second machine learning model using training data sets corresponding to a second vehicle part after replacement in response to detecting a replacement of the first vehicle part with the second vehicle part only when the detecting detects that the first vehicle part relating to input data of the first machine learning model is replaced with the second vehicle part having a different configuration or different properties than the first vehicle part, and
   wherein the processor includes a first processor configured to detect replacement of the first vehicle part mounted in the vehicle,
   and a second processor configured to retrain the first machine learning model to obtain the second machine learning model,
   the first processor is provided at a server and the second processor is provided at the vehicle, and
   the second processor is configured to apply the second machine learning model to the vehicle.

6. The machine learning device according to claim 1, wherein the vehicle is a motorized vehicle.

7. The machine learning device according to claim 1, wherein the processor detects the replacement of the first vehicle part mounted in the vehicle based on input to an input device.

* * * * *